US012687636B2

(12) United States Patent
He et al.

(10) Patent No.: US 12,687,636 B2
(45) Date of Patent: Jul. 21, 2026

(54) METHOD AND APPARATUS FOR DETECTING OPERATING TERRAIN, AND ENGINEERING EQUIPMENT FOR DETECTING OPERATING TERRAIN

(71) Applicant: BEIJING BAIDU NETCOM SCIENCE TECHNOLOGY CO., LTD., Beijing (CN)

(72) Inventors: Zhenpeng He, Beijing (CN); Lingfeng Qian, Beijing (CN); Liangjun Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 948 days.

(21) Appl. No.: 17/931,473

(22) Filed: Sep. 12, 2022

(65) Prior Publication Data

US 2023/0003893 A1 Jan. 5, 2023

(30) Foreign Application Priority Data

Feb. 23, 2022 (CN) .......................... 202210167203.4

(51) Int. Cl.
| | |
|---|---|
| *G01S 17/89* | (2020.01) |
| *G01S 7/48* | (2006.01) |

(52) U.S. Cl.
CPC ............ *G01S 17/89* (2013.01); *G01S 7/4802* (2013.01); *G01S 7/4808* (2013.01)

(58) Field of Classification Search
CPC ...... G01S 17/89; G01S 7/4802; G01S 7/4808; G01S 7/003; G01S 17/42; G01S 17/86;
(Continued)

(56) References Cited

U.S. PATENT DOCUMENTS

2017/0178333 A1* 6/2017 Zhang ................... G06T 7/0004
2018/0092304 A1* 4/2018 Moore ................... A01D 46/30
(Continued)

FOREIGN PATENT DOCUMENTS

| CN | 112348781 A | 2/2021 |
|---|---|---|
| CN | 113253294 A | 8/2021 |

(Continued)

OTHER PUBLICATIONS

Cai Yujian et al., "A Novel Extrinsic Calibration Method of a Camera-And-LiDAR System", 2021 IEEE 7th International Conference on Virtual Reality (ICVR), IEEE, May 20, 2021 (May 20, 2021), pp. 109-116.

(Continued)

*Primary Examiner* — Iriana Cruz
(74) *Attorney, Agent, or Firm* — FisherBroyles, LLP

(57) ABSTRACT

A method for detecting an operating terrain is provided. The method includes obtaining point cloud data of an operating region that are collected by a laser radar at a current time, including three-dimensional coordinates of a plurality of sampling points. The operating region is divided into a plurality of grids, each having a corresponding height value. The method includes for any grid determining an input point of the grid from the plurality of sampling points, based on the three-dimensional coordinates. The method includes determining a type of the input point, based on a height coordinate of the input point and the height value of the grid. The type includes a noise point and a ground point. The method includes in response to determining that the input point is the ground point, updating the height value of the grid based on the height coordinate of the input point.

13 Claims, 8 Drawing Sheets

(58) Field of Classification Search
CPC ...... G01S 7/4817; G01S 17/931; G01S 17/88;
G01S 17/894; Y02A 90/10; G06T
2210/56; G06T 17/05; G06T 5/70; G06T
7/73; G06T 2207/10028; G01C 21/3826;
G06V 20/588; E02F 9/205; G01B 11/24
See application file for complete search history.

(56) References Cited

U.S. PATENT DOCUMENTS

| | | | |
|---|---|---|---|
| 2020/0394813 A1* | 12/2020 | Theverapperuma | ......................... G05D 1/0257 |
| 2020/0402300 A1* | 12/2020 | Ding | ......................... G06T 7/11 |
| 2021/0027532 A1* | 1/2021 | Lin | ......................... G06T 17/05 |
| 2021/0056685 A1* | 2/2021 | Zhang | ................... G06T 7/0012 |
| 2021/0327128 A1 | 10/2021 | Yu | |
| 2024/0228239 A1* | 7/2024 | Mannari | ................. B66C 13/48 |

FOREIGN PATENT DOCUMENTS

| | | | | |
|---|---|---|---|---|
| EP | 3620812 A1 * | 3/2020 | ............ | G01S 17/42 |
| JP | 2020042009 A | 3/2020 | | |
| JP | 2020107021 A | 7/2020 | | |
| JP | 2021051057 A | 4/2021 | | |
| JP | 2021175972 A | 11/2021 | | |
| KR | 20210111180 A | 9/2021 | | |
| WO | 2022022694 A1 | 2/2022 | | |

OTHER PUBLICATIONS

European Search Report issued in the counterpart EP application No. 22196269.9 (Official mailing date: Mar. 29, 2023), 2 pages.
First Office Action of the counterpart KR application No. 10-2022-0113396, Official mailing date: Apr. 26, 2024, 7 pages.
1st Office Action of the counterpart JP application No. 2022-147536 (Official mailing date: Sep. 27, 2023), Sep. 27, 2023, 4 pages.

* cited by examiner

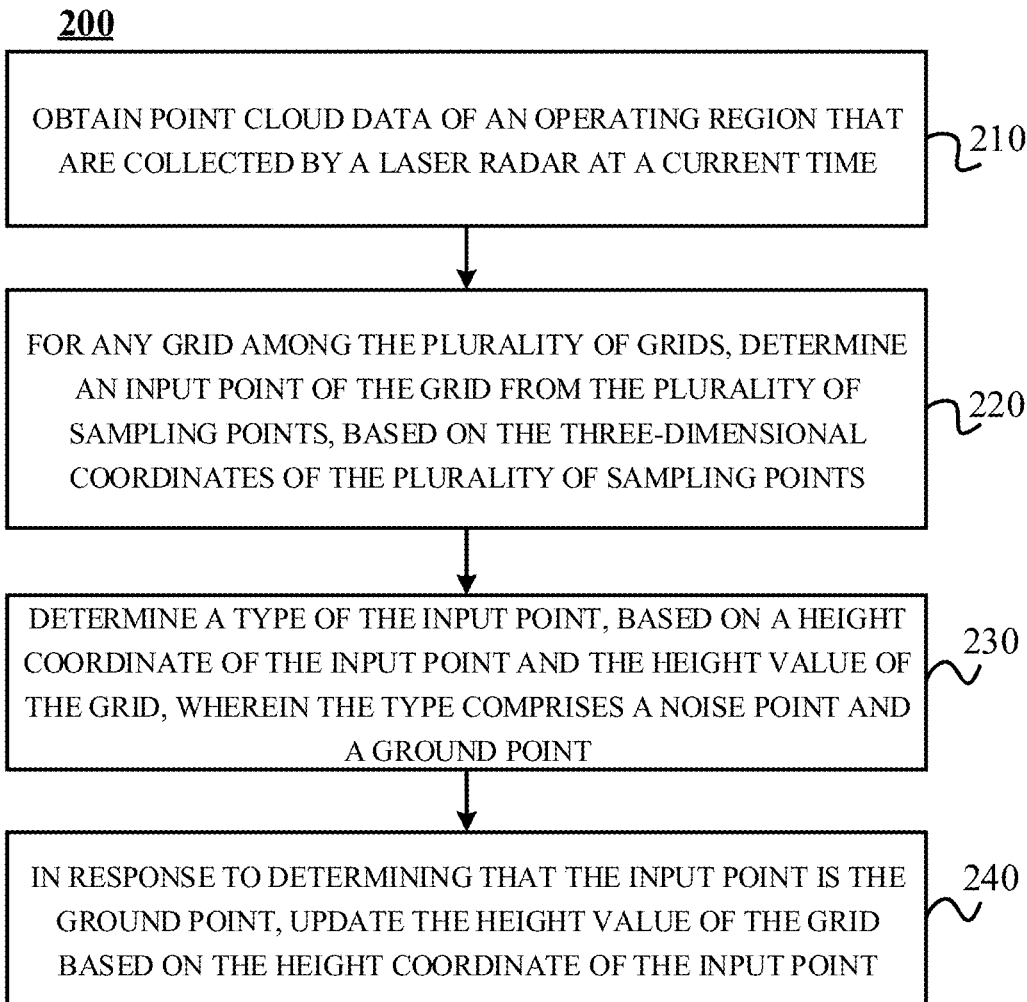

200

OBTAIN POINT CLOUD DATA OF AN OPERATING REGION THAT ARE COLLECTED BY A LASER RADAR AT A CURRENT TIME — 210

FOR ANY GRID AMONG THE PLURALITY OF GRIDS, DETERMINE AN INPUT POINT OF THE GRID FROM THE PLURALITY OF SAMPLING POINTS, BASED ON THE THREE-DIMENSIONAL COORDINATES OF THE PLURALITY OF SAMPLING POINTS — 220

DETERMINE A TYPE OF THE INPUT POINT, BASED ON A HEIGHT COORDINATE OF THE INPUT POINT AND THE HEIGHT VALUE OF THE GRID, WHEREIN THE TYPE COMPRISES A NOISE POINT AND A GROUND POINT — 230

IN RESPONSE TO DETERMINING THAT THE INPUT POINT IS THE GROUND POINT, UPDATE THE HEIGHT VALUE OF THE GRID BASED ON THE HEIGHT COORDINATE OF THE INPUT POINT — 240

METHOD AND APPARATUS FOR DETECTING OPERATING TERRAIN, AND ENGINEERING EQUIPMENT FOR DETECTING OPERATING TERRAIN

CROSS REFERENCE TO RELATED APPLICATION

This application claims priority to Chinese Patent Application No. 202210167203.4 filed on Feb. 23, 2022, the contents of which are hereby incorporated by reference in their entirety for all purposes.

TECHNICAL FIELD

The disclosure relates to the technical field of computers, especially, the technical field of automatic driving and unmanned engineering operation, in particular to a method and apparatus for detecting an operating terrain, an electronic device, a computer-readable storage medium, a computer program product and an engineering equipment for detecting the operating terrain.

BACKGROUND

An engineering equipment is used in engineering operations (for example, mineral mining, housing construction, pipe laying and the like), which is, for example, an excavator, an electric shovel, a bulldozer, a crane, a road roller and the like. In general, the engineering equipment works under on-site operation by a worker.

A method described in this part is not necessarily a method envisaged or adopted before. Unless otherwise indicated, it should not be presumed that any of methods described in this part is regarded as the prior art only depending on being included in this part. Likewise, unless otherwise indicated, the problem mentioned in this part should not be constructed as being recognized in any prior art.

SUMMARY

The disclosure provides a method and apparatus for detecting an operating terrain, an electronic device, a computer-readable storage medium, a computer program product and an engineering equipment for detecting the operating terrain.

According to an aspect of the disclosure, a method for detecting an operating terrain is provided and includes obtaining point cloud data of an operating region that are collected by a laser radar at a current time, wherein the operating region is divided into a plurality of grids, and each grid of the plurality of grids has a corresponding height value, and wherein the point cloud data comprise three-dimensional coordinates of a plurality of sampling points; for any grid among the plurality of grids: determining an input point of the grid from the plurality of sampling points, based on the three-dimensional coordinates of the plurality of sampling points; determining a type of the input point, based on a height coordinate of the input point and the height value of the grid, wherein the type comprises a noise point and a ground point; and in response to determining that the input point is the ground point, updating the height value of the grid based on the height coordinate of the input point.

According to an aspect of the disclosure, an electronic device is provided and includes: at least one processor; and a memory in communication connection with the at least one processor, wherein the memory stores instructions executable by the at least one processor, and the instructions, when executed by the at least one processor, enable the at least one processor to perform the above method.

According to an aspect of the disclosure, a non-transitory computer-readable storage medium storing computer instructions is provided, wherein the computer instructions are configured to enable a computer to perform the above method.

It should be understood that described contents in this part are neither intended to indicate key or important features of the embodiments of the disclosure, nor used to limit the scope of the disclosure. Other features of the disclosure will become easier to understand through the following specification.

BRIEF DESCRIPTION OF THE DRAWINGS

Accompanying drawings, which constitute a part of the specification, illustrate some embodiments and, together with text description of the specification, serve to explain example implementations of the embodiments. The illustrated embodiments are only intended to serve as examples without limiting the scope of the claims. In all the accompanying drawings, the same reference numbers represent similar but not necessarily the same elements.

FIG. 2 illustrates a flowchart of a method for detecting an operating terrain according to an embodiment of the disclosure.

DETAILED DESCRIPTION

Figure 1:
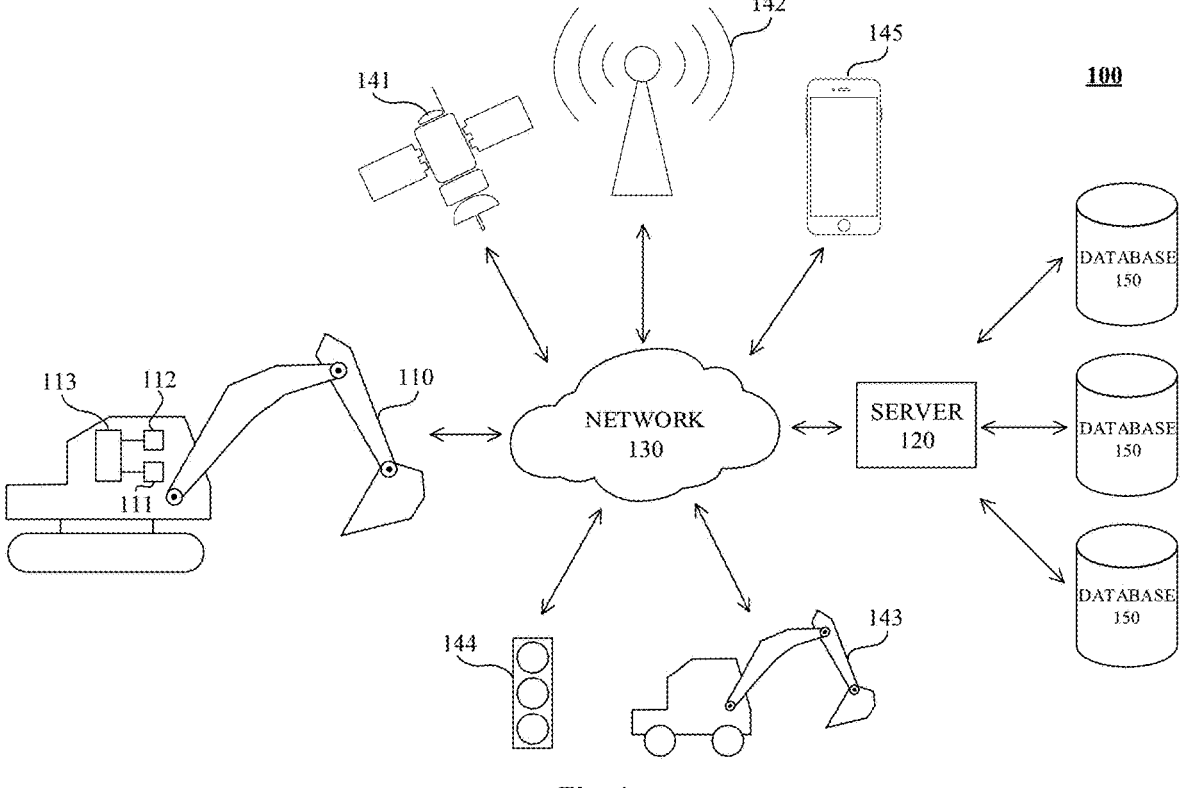
FIG. 1 illustrates a schematic diagram of an example system in which various methods described herein may be implemented according to an embodiment of the disclosure.

Example embodiments of the disclosure are described below with reference to the accompanying drawings, which include various details of the embodiments of the disclosure for better understanding and should be regarded as only examples. Therefore, those ordinarily skilled in the art should realize that various changes and modifications can be made to embodiments described herein without departing from the scope of the disclosure. Similarly, for the sake of being clear and concise, description of known functions and structures is omitted in the following description.

In the disclosure, unless otherwise stated, terms such as "first" and "second" used for describing various elements are not intended to limit a position relation, a timing sequence relation or a significance relation of these elements and are only used for distinguishing one component from another component. In some examples, a first element and a second element may refer to the same instance of the elements, which, in some cases, may also refer to different instances on the basis of description of the context.

Terms used in description of various examples in the disclosure are only intended to describe specific examples but not intended to make a limitation. Unless otherwise indicated clearly in the context, if the quantity of elements is not limited in particular, there may be one or a plurality of the elements. Besides, a term "and/or" used in the disclosure covers any one or all possible combinations in listed items.

In the technical solution of the disclosure, the obtaining, storing, applying and the like of the involved user personal information conform to regulations of relevant laws and regulations and do not violate public order and good morals.

An engineering operating site (also called a construction site) is usually outdoor in a harsh environment. An engineering equipment getting intelligent and unmanned is a current development trend. The engineering equipment senses the surrounding environment through a sensor arranged thereon and performs unmanned autonomous operation by using the sensed environment information, so as to improve safety and efficiency of the engineering operation.

In an unmanned operation scenario in which a ground operation is involved, the engineering equipment needs to detect an operating terrain (that is, ups and downs of the ground, also height values of different ground regions) in real time and makes a plan and performs the operation based on the operating terrain.

In the related art, the conventional method for detecting the operating terrain includes the following three types.

First type: the point cloud data of the ground that are collected by a laser radar are reconstructed by using a three-dimensional surface reconstruction technology (for example, a Poisson surface reconstruction technology and the like) to generate a grid model of the ground, and thus the operating terrain is obtained. The method has large computing amount and low computing speed, which is incapable of realizing a real-time terrain detection.

Second type: the operating region is divided into a plurality of grids, in which by using the point cloud data that are collected by the laser radar within a period of time in the past, an average height of the point cloud data in each grid is calculated as a terrain height of the grid so as to generate a grid elevation map. However, dusts (for example, ground flying dusts, smoke and the like) usually exist in the engineering operating site, which may be scanned by the laser radar, and consequently, many noise points are contained in the point cloud data. The method directly uses the average height of the point cloud data as the ground height, so the accuracy is low and the real-time property cannot meet an engineering operating requirement.

Third type: multiple frames of environment depth images are collected by a depth camera, in which based on each frame of the depth image, the ground height value of each grid is updated in real time by using a Kalman filter algorithm to generate the grid elevation map. The method is good in the real-time property but not ideal in dust denoising. Besides, since an effective distance of the depth camera is short (that is, the collected depth image is accurate only under a condition that the object is closer to the depth camera), the precision is insufficient for large engineering equipment, and the terrain detection accuracy is low.

In view of the above problems, an embodiment of the disclosure provides a method for detecting an operating terrain so as to realize an accurate and real-time operating terrain detection.

The embodiment of the disclosure will be described in detail below with reference to the accompanying drawings.

FIG. 1 illustrates a schematic diagram of an example system 100 in which various methods and apparatuses described herein may be implemented according to an embodiment of the disclosure. Referring to FIG. 1, the system 100 includes an engineering equipment 110, a server 120 and one or more communication networks 130 coupling the engineering equipment 110 to the server 120.

The engineering equipment 110 may be any device used in an engineering operation (for example, mineral mining, housing construction, pipe laying and the like), including but not limited to an excavator, an electric shovel, a bulldozer, a crane, a road roller and the like. In the embodiment of the disclosure, the engineering equipment 110 may include an electronic device according to an embodiment of the disclosure and/or is configured to execute the method according to the embodiment of the disclosure.

The server 120 can run one or more services or software applications so as to enable them to execute the method for detecting the operating terrain. In certain embodiments, the server 120 may further provide other services or software applications which may include a non-virtual environment and a virtual environment. In configuration shown in FIG. 1, the server 120 may include one or more components which implement functions executed by the server 120. These components may include a software component, a hardware component or their combination capable of being executed by one or more processors. A user of the engineering equipment 110 can successively utilize one or more client application programs to interact with the server 120 so as to utilize services provided by these components. It should be understood that various different system configurations are possible and may be different from the system 100. Thus, FIG. 1 is an example of a system used for implementing various methods described herein, which is not intended to make a limitation.

The server 120 may include one or more general-purpose computers, special-purpose server computers (for example, a personal computer (PC) server, a UNIX server, a mid-range server), a blade server, a mainframe computer, a server cluster or any other appropriate arrangement and/or combination. The server 120 may include one or a plurality of virtual machines which run a virtual operating system, or other computing architectures involving virtualization (for example, one or more flexible pools capable of being virtualized to maintain a logical storage device of a virtual storage device of the server). In various embodiments, the server 120 can run one or more services or software applications providing the following described functions.

A computing unit in the server 120 can run one or more operating systems including any above operating system and any commercially available server operating system. The server 120 can further run any one of various additional server application programs and/or middle-layer application programs, including an HTTP server, an FTP server, a CGI server, a JAVA server, a database server and the like.

In some implementations, the server 120 may include one or more application programs so as to analyze and merge data feeds and/or event updates received from the engineering equipment 110. The server 120 may further include one or more application programs so as to display data feeds and/or real-time events via one or more display devices of the engineering equipment 110.

A network 130 may be any type of networks well known to those skilled in the art and can use any one type of a plurality of types of available protocols (including but not limited to TCP/IP, SNA, IPX and the like) to support data communication. Merely serving as an example, one or more networks 130 may be the Ethernet, a satellite communication network, a local area network (LAN), an Ethernet-based network, a Token ring, a wide area network (WAN), the Internet, a virtual network, a virtual private network (VPN), an intranet, an extranet, a public switched telephone network (PSTN), an infrared network, a wireless network (including, for example, Bluetooth, and Wi-Fi) and/or any combination of these networks and other networks.

The system 100 may further include one or more databases 150. In certain embodiments, these databases may be used for storing data and other information. For example, one or more of the databases 150 may be used for storing information such as an audio file and a video file. The database 150 may reside in various positions. For example, the database used by the server 120 may be in the local of the server 120, or may be remote from the server 120 and can communicate with the server 120 via a network-based or dedicated connection. The database 150 may be different types. In certain embodiments, the database used by the server 120 may be a relational database or a non-relational database. One or more of these databases may store, update and retrieve data to and from the database in response to a command.

In certain embodiments, one or more of the databases 150 may be further used by an application program to store application program data. The database used by the application program may be different types of databases, for example, a key value storage database, an object storage database or a conventional storage database supported by a file system.

The engineering equipment 110 may include a sensor 111 used for sensing the surrounding environment. The sensor 111 may include one or more of the following sensors: a visual camera, an infrared camera, an ultrasonic sensor, a millimeter-wave radar and a laser radar (LiDAR). Different sensors can provide different detection precisions and ranges. A plurality of the same sensors may be arranged so as to widen a detection range. A camera may be mounted in front, in rear or in other positions of the engineering equipment. The visual camera may capture conditions inside or outside the engineering equipment in real time and display the conditions to a worker. Besides, information such as device environment, other engineering equipment running status and the like can be obtained by analyzing a picture captured by the visual camera. The infrared camera can capture an object under a condition of night vision. The ultrasonic sensor may be mounted around the engineering equipment and configured to measure a distance between an environment object and the engineering equipment by using features of high directivity and the like of ultrasonic waves. The millimeter-wave radar may be mounted in front, in rear or in other positions of the engineering equipment and configured to measure the distance between the environment object and the engineering equipment by using a feature of electromagnetic waves. The laser radar may be mounted in front, in rear or in other positions of the engineering equipment and configured to detect object edge and shape information so as to perform object recognition and tracking. Because of a Doppler effect, a radar apparatus may also measure a speed change of the engineering equipment and the moving object.

The engineering equipment 110 may further include a communication apparatus 112. The communication apparatus 112 may include a satellite positioning module which can receive a satellite positioning signal (for example, Beidou, GPS, GLONASS and GALILEO) from a satellite 141 and generate coordinates based on these signals. The communication apparatus 112 may further include a real time kinematic (RTK) module and can perform real-time centimeter-level positioning outdoors and improve outdoor positioning precision and operation efficiency. The communication apparatus 112 may further include a module communicating with a mobile communication base station 142. A mobile communication network can implement any suitable communication technology, for example, a wireless communication technology (for example, 5G technology) at present or under continuous development such as GSM/GPRS, CDMA and LTE. Under the condition that the engineering equipment is an engineering vehicle (for example, the excavator, the bulldozer and the like), the communication apparatus 112 may further have an Internet of Vehicles or a vehicle-to-everything (V2X) module which is configured to realize communication between a vehicle and the outside, for example, vehicle-to-vehicle (V2V) communication with other engineering vehicles 143 and vehicle-to-infrastructure (V2I) communication with an infrastructure 144. Besides, the communication apparatus 112 may further have a module configured to communicate with a user terminal 145 (including but not limited to a smartphone, a tablet computer or a wearable apparatus such as a watch) through, for example, a wireless local area network or Bluetooth using an IEEE802.11 standard. The engineering equipment 110 may be also connected into the server 120 via the network 130 by using the communication apparatus 112.

The engineering equipment 110 may further include a control apparatus 113. The control apparatus 113 may include a processor, for example, a central processing unit (CPU) or a graphics processing unit (GPU) or other special-purpose processors and the like which communicate with various types of computer-readable storage apparatuses or media. Under the condition that the engineering equipment 110 is the engineering vehicle, the control apparatus 113 may include an automatic driving system configured to automatically control various actuators in the vehicle. The automatic driving system is configured to control a power assembly, a steering system, a braking system and the like (not shown) of the engineering equipment 110 in response to an input from a plurality of sensors 111 or other input devices via the plurality of actuators so as to respectively control speeding up, steering and braking without manual intervention or with limited manual intervention. A part of processing functions of the control apparatus 113 may be realized through cloud computing. For example, some processing may be executed by using a vehicle-mounted processor, and meanwhile, some other processing may be executed by using a cloud computing resource. The control apparatus 113 may be configured to execute the method according to the disclosure. Besides, the control apparatus 113 may be realized as an example of an electronic device of an engineering equipment side (a client) according to the disclosure.

The system 100 in FIG. 1 may be configured and operated in various modes so as to apply various methods and apparatuses described according to the disclosure.

FIG. 2 illustrates a flowchart of a method 200 for detecting an operating terrain according to an embodiment of the disclosure. The method 200 is usually executed at the local of the engineering equipment (for example, the engineering equipment 110 shown in FIG. 1), so as to avoid data transmission and to improve the real-time property and the computing efficiency of the operating terrain detection. It can be understood that in some cases, the method 200 may also be executed at a server (for example, the server 120 shown in FIG. 1). That is, an executive body of each step of the method 200 is usually the engineering equipment 110 (specifically, which may be a control apparatus 113 in the engineering equipment 110) shown in FIG. 1, or may be the server 120 shown in FIG. 1.

As shown in FIG. 2, the method 200 includes steps 210 to 240.

In step 210, point cloud data of an operating region that are collected by a laser radar at a current time are obtained, wherein the operating region is divided into a plurality of grids, and each grid of the plurality of grids has a corresponding height value, and wherein the point cloud data include three-dimensional coordinates of a plurality of sampling points;

In step 220, for any one grid among the plurality of grids, an input point of the grid is determined from the plurality of sampling points based on the three-dimensional coordinates of the plurality of sampling points.

In step 230, a type of the input point is determined based on the height coordinate of the input point and a height value of the grid, wherein the type includes a noise point and a ground point.

In step 240, in response to determining that the input point is the ground point, the height value of the grid is updated based on the height coordinate of the input point.

According to the embodiment of the disclosure, by means of obtaining in real time the point cloud data that are collected by the laser radar and based on the three-dimensional coordinate of each sampling point, the sampling point (that is, the input point) used for updating the height value of the grid corresponding to each grid is determined. Furthermore, it may be determined that whether the input point of the grid is the noise point or the ground point, and the height value of the grid is updated solely based on the height coordinate of the ground point, so that the noise point can be effectively filtered, the accuracy of terrain detection can be improved, and the accurate and real-time operating terrain detection can be realized.

Each step of the method 200 is described in detail below.

In step 210, the point cloud data of the operating region that are collected by the laser radar at the current time are obtained.

As described above, the laser radar may be fixed, for example, in front, on a side or in other positions of the engineering equipment and a plurality of laser radars may be arranged. The laser radar emits laser beams towards the surrounding environment so as to collect the point cloud data of the surrounding environment.

The point cloud data collected by the laser radar include a large quantity of sampling points, and each sampling point includes a three-dimensional coordinate, i.e., (x, y, z), which is used for representing a space position of the sampling point. An x coordinate and a y coordinate are used for representing a position of the sampling point in a horizontal direction, and a z coordinate is used for representing a position of the sampling point in a height direction, i.e., an altitude of the sampling point. In the embodiment of the disclosure, the z coordinate is called a height coordinate. In general, each sampling point also includes a laser reflection intensity and an attitude angle (including a yaw angle, a pitch angle, and a rolling angle) relative to the laser radar.

In general, the original three-dimensional coordinates of the sampling points collected by the laser radar are the three-dimensional coordinates under a laser radar coordinate system. According to some embodiments, in order to conveniently detect the operating terrain and generate the grid elevation map of the ground, the three-dimensional coordinates under the laser radar coordinate system need to be transformed to be under a world coordinate system (e.g., a UTM coordinate system, a WGS84 coordinate system and the like), i.e., the three-dimensional coordinates in step 210 refer to three-dimensional coordinates under the world coordinate system.

According to some embodiments, a positioning module, for example, the RTK module, is arranged on the engineering equipment on which the laser radar is located. The RTK module can collect its own pose information in real time, which includes its own three-dimensional coordinates and the attitude angle (including the yaw angle, the pitch angle and the rolling angle) under the world coordinate system.

Based on the pose information collected by the RTK module, the point cloud data under the laser radar coordinate system may be transformed to be under the world coordinate system. Specifically, positions of the RTK module and of the laser radar that are relative to the machine body of the engineering equipment may be calibrated respectively. Based on the pose information collected by the RTK module, a transformation relation between an RTK coordinate system and the world coordinate system (the transformation relation generally includes a translation vector and a transformation matrix) may be obtained. According to the calibrated positions of the RTK module and of the laser radar that are relative to the machine body of the engineering equipment, a transformation relation between the laser radar coordinate system and the RTK coordinate system may be obtained. Based on the transformation relation between the laser radar coordinate system and the RTK coordinate system, as well as the transformation relation between the RTK coordinate system and the world coordinate system, a transformation relation between the laser radar coordinate system and the world coordinate system may be obtained. Based on the transformation relation between the laser radar coordinate system and the world coordinate system, the three-dimensional coordinates under the laser radar coordinate system may be transformed to under the world coordinate system.

The laser radar can emit laser beams continuously, so that the point cloud data of the surrounding environment are collected continuously. According to some embodiments, in order to conveniently detect the operating terrain in real time, the laser radar transmits the collected point cloud data back to the control apparatus of the engineering equipment according to a certain time interval, and accordingly, the control apparatus of the engineering equipment obtains the point cloud data collected by the laser radar according to the certain time interval. In the embodiment of the disclosure, the point cloud data returned by the laser radar at each time may be called "a frame of point cloud data". According to some embodiments, the time interval of returning the point cloud data by the laser radar may be set to have a small value, for example, 0.1 s, so that the real-time property and the accuracy of detection of the operating terrain are improved.

According to some embodiments, the point cloud data are obtained by scanning the operating region via the laser radar according to a non-repetitive scanning path. It is noted that the non-repetitive scanning path of the embodiment of the disclosure means that the scanning path in each time interval is non-repetitive, which does not mean that the scanning path is non-repetitive in a whole operating process of the laser radar. Since the non-repetitive scanning can collect the dense point cloud data corresponding to different positions through time accumulation with no movement of the laser radar (while the common 360° repetitive scanning can only obtain the dense point cloud by moving the laser radar), the stability and accuracy of data collection are improved, and thus the accuracy of detection of the operating terrain can be improved.

Besides, the quantity of laser emitters needed by the non-repetitive scanning of the laser radar (which, the quantity of wires is usually in a single digit) is usually far more smaller than that of the 360° repetitive scanning laser radar (which, in order to collect the dense point cloud data, the quantity of wires needs to reach 64, 128 or more), and thus the cost can be greatly reduced.

It can be understood that a scanning range of the laser radar is usually large. Given that the operating region of the engineering equipment has to be a region which can be touched by the engineering equipment, according to some embodiments, the operating region in step 210 may be set as a region with a certain size using the position of the engineering equipment (for example, the position of the engineering equipment may be obtained through the RTK module) as a center, for example, a region of 100 m*100 m. Furthermore, the operating region is divided into the plurality of grids, and each grid has a fixed size (for example, 0.2 m*0.2 m). In the embodiment of the disclosure, a size of a single grid may be called a resolution of the operating region. Based on the above embodiment, by obtaining in real time the position of the engineering equipment, the operating region is determined based on the position of the engineering equipment, and only the point cloud data in the operating region are processed, so that the quantity of the data that are to be processed can be reduced, and the detection efficiency and the real-time property of the operating terrain are improved.

In the embodiment of the disclosure, the position of each grid is indexed through the horizontal and longitudinal coordinates (the x coordinate and y coordinate), and the terrain information is recorded by storing the height value of the grid.

In step 220, the input point of each grid is determined from the plurality of sampling points based on the three-dimensional coordinates of the plurality of sampling points.

According to some embodiments, the input point of each grid can be determined through the following steps. A sampling point set corresponding to the grid is determined based on the three-dimensional coordinates of the plurality of sampling points, wherein the sampling point set includes sampling points in the grid. A sampling point with the largest height coordinate in the sampling point set is used as the input point of the grid. The input point is used for updating the height value of the grid. According to different actual conditions, the sampling point set corresponding to the grid may include any quantity of sampling points. For example, in some cases, the sampling point set of the grid may include one or more sampling points. In other cases, the sampling point set of the grid may be null.

It can be understood that the quantities and the height distributions corresponding to the sampling points of different grids at the same time are different, and the quantities and the height distributions corresponding to the sampling points of the same grid at different times are also different. This kind of variation would make terrain restoration difficult. Based on the above embodiment, by using the sampling point with the largest height coordinate in the sampling point set as the input point, the stability of the input data can be guaranteed. Besides, due to abandonment of other sampling points, the computing efficiency can be improved, the storage space can be saved, and the real-time detection of the operating terrain can be realized. Meanwhile, an interference caused when the laser radar scans a vertical object to return a plurality of height values can also be avoided by the above embodiment.

According to some other embodiments, an average value of the height coordinates of the sampling points in the sampling point set may also be used as the input point of the grid.

In step 230, the type of the input point is determined based on the height coordinate of the input point and the height value of the grid, wherein the type of the input point includes the noise point and the ground point.

According to some embodiments, the input point is determined as the noise point in response to determining that a difference between the height coordinate of the input point and the height value of the grid is greater than a first threshold. The first threshold may be, for example, set to be 0.5 m. It can be understood that as the dusts float above the ground, the height of the noise point is usually higher than the ground height (i.e., the height value of the grid). The noise point can be fast identified by comparing the height coordinate of the input point with the height value of the grid.

According to some embodiments, the input point is determined as the ground point in response to determining that any one of the following conditions is met: the difference between the height coordinate of the input point and the height value of the grid is smaller than or equal to the first threshold (Condition I); or the difference between the height coordinate of the input point and the height value of the grid is greater than the first threshold, and the quantity of the input points of the grid determined as the noise point within a preset duration is greater than or equal to a second threshold (Condition II). The preset duration may be, for example, set to be 1 s, and the second threshold may be, for example, set to be 5.

In the above embodiment, in Condition I, the ground point can be fast and accurately identified by comparing the height coordinate of the input point with the height value of the grid in the case that the ground height in the grid decreases, remains unchanged or slowly increases (the increased quantity within a unit time is smaller than the first threshold). In the Condition II, the ground point can be fast and accurately identified in the case that the ground height in the grid increases fast (the increased quantity within a unit time is greater than or equal to the first threshold).

According to some embodiments, each grid has a corresponding noise point container and a ground point container which are respectively used for storing historical noise points and historical ground points closest to the current time. The noise point container and the ground point container may be, for example, realized as an array, a chain table, a set or any other data structure.

Accordingly, according to some embodiments, the method 200 further includes the following steps. The input point is added into the noise point container corresponding to the grid in response to determining that the input point is the noise point. The noise point with the earliest collection time in the noise point container is deleted in response to determining that the quantity of noise points in the noise point container is greater than or equal to a third threshold. Thus, the noise point container only stores a small quantity (smaller than the third threshold) of the historical noise points closest to the current time, so that the storage space can be saved, and the real-time detection of the operating terrain can be realized.

According to some embodiments, the method 200 further includes the following steps. The input point is added into the ground point container corresponding to the grid in response to determining that the input point is the ground point; and a ground point with the earliest collection time in the ground point container is deleted in response to determining that the quantity of ground points in the ground point container is greater than or equal to a fourth threshold. Thus, the ground point container only stores a small quantity (smaller than a fourth threshold) of historical ground points closest to the current time, so that the storage space can be saved, the computing amount can be reduced, the computing efficiency of the height values of the grids can be improved, and the real-time detection of the operating terrain can be realized.

According to some embodiments, the third threshold and the fourth threshold may be set as the same value, for example, 5. Besides, the values of the third threshold and the fourth threshold may be the same as the second threshold, for example, the three of which are 5.

In step 240, the height value of the grid is updated based on the height coordinate of the input point in response to determining that the input point is the ground point in step 230. Specifically, the height value of the grid may be updated to be an average value of the height coordinates of the ground points in the ground point container. Based on the above embodiment, by using the average height coordinate of the ground points (i.e., the ground points in the ground point container) within a period of most recent time as the height value of the grid, the accuracy and the real-time property of detection of the operating terrain can be improved.

It is noted that the above steps 210 to 240 describe a process of real-time updating of the height value of each grid. The above steps 210-240 are executed at each time the laser radar returns a frame of point cloud data to update the height value of each grid.

It can be understood that the method 200 may further include a process of initializing the height value of each grid. According to some embodiments, an initial value of the height value of the grid may be set as the height coordinate of a first input point of the grid. Specifically, after the input point of a certain grid is determined through step 220, if the current height value of the grid is null, that is, the grid has no corresponding historical point cloud data at present, the height value of the grid is initialized as the height coordinate of the current input point. If the current height value of the grid is not null, the height value of the grid is updated through the above steps 230 and 240.

Figure 3:
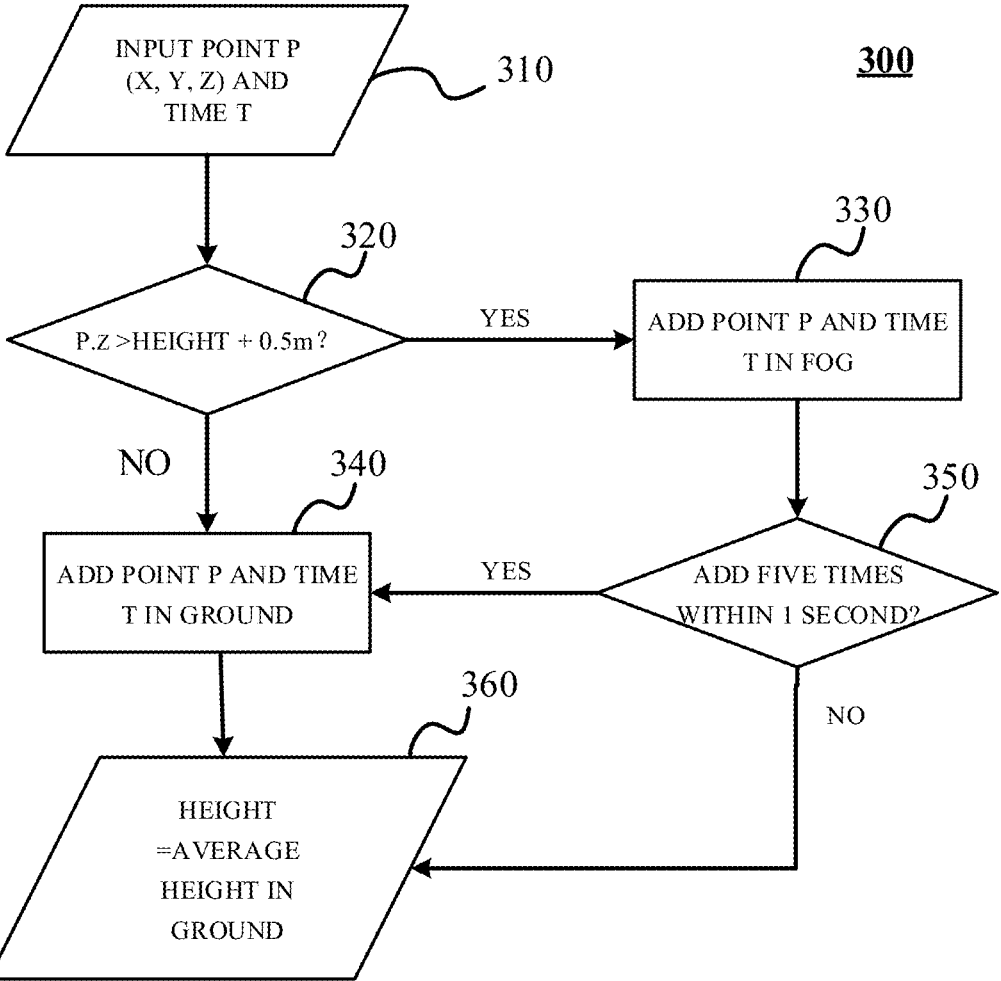
FIG. 3 illustrates a flowchart of a process of updating a height value of a grid according to an embodiment of the disclosure.

FIG. 3 illustrates a flowchart of a process 300 of updating a height value of a grid according to an embodiment of the disclosure. As shown in FIG. 3, the process 300 includes steps 310 to 360. In steps 310 to 360, the step shown in a parallelogram block represents a data input/output step, the step shown in a rectangular block represents a data processing step, and the step shown in a diamond block represents a determining step.

As shown in FIG. 3, in step 310, a three-dimensional coordinate (x, y, z) of the input point P and a collection time t of the input point P are obtained.

Subsequently, in step 320, it is determined that whether the difference between the height coordinate z (i.e., "P·z") of the input point P and the current height value "height" of the grid is greater than 0.5 m (i.e., the first threshold), that is, whether P·z>height+0.5 m is met.

If the determination is NO in step 320, step 340 is executed, in which the input point P is used as the ground point to be added into the ground point container "ground", and the collection time t of the input point P is stored.

If the determination is YES in step 320, step 330 is executed, in which the input point P is used as the noise point to be added into the noise point container "fog". Subsequently, step 350 is executed, and it is determined that whether the quantity of noise points added into the fog container reaches 5 (i.e., the third threshold) within 1 s (i.e., the preset duration).

If the determination is YES in step 350, step 340 is executed, in which the input point P is used as the ground point to be added into the ground point container "ground", and the collection time t of the input point P is stored. Subsequently, step 360 is further executed.

If the determination is NO in step 350, step 360 is executed.

In step 360, the height value of the grid is updated to be the average value of the height coordinates of the ground points in the ground point container, i.e., height=an average height of the ground points in "ground".

Figure 4:
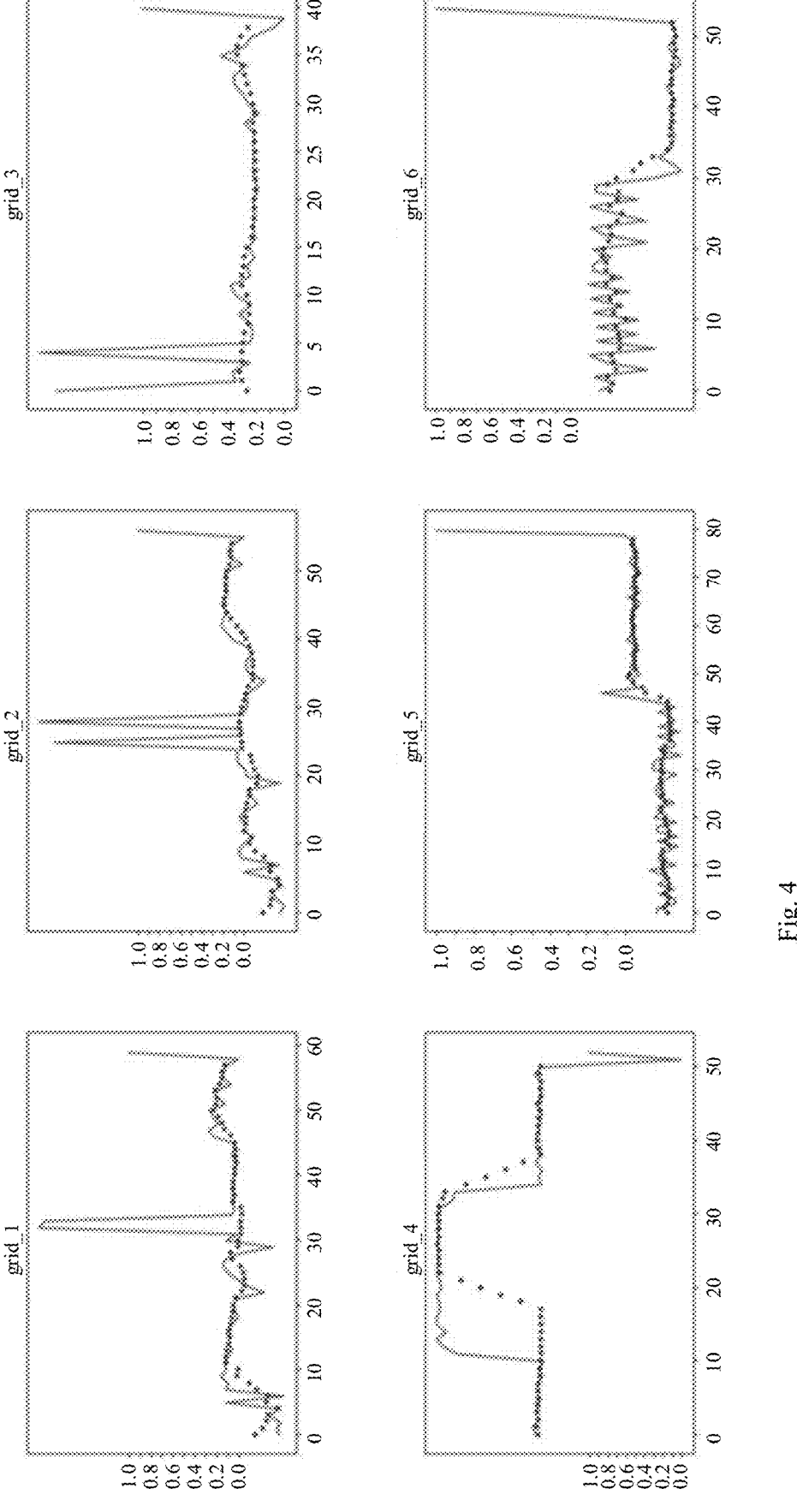
FIG. 4 illustrates a schematic diagram of a process of updating height values of different grids according to an embodiment of the disclosure.

FIG. 4 illustrates a schematic diagram of a process of updating height values of different grids according to an embodiment of the disclosure. Each curve diagram in FIG. 4 corresponds to a grid.

In each curve diagram, a horizontal coordinate represents the quantity of times (which is corresponding to a time) of inputting the input point P (x, y, z) in the grid, and a longitudinal coordinate represents a height value (the unit is m). A full line represents the height coordinate (z coordinate) of the input point P, and a dotted line represents the height value "height" of the grid. It can be seen from FIG. 4 that the method of the embodiment of the disclosure can effectively filter an abrupt dust noise point (see the curve diagrams grid_1, grid_2 and grid_3), meanwhile, it can timely respond to normal increasing (for example, charging) of the ground height (see the curve diagram grid_4). Besides, it can be seen from the curve diagrams grid_5 and grid_6 that through the embodiment of the disclosure, the height value of the grid can also be effectively stabilized under the condition that a fluctuation occurs to the height coordinates of the sampling points in a certain region caused by non-repetitive scanning.

Figure 5:
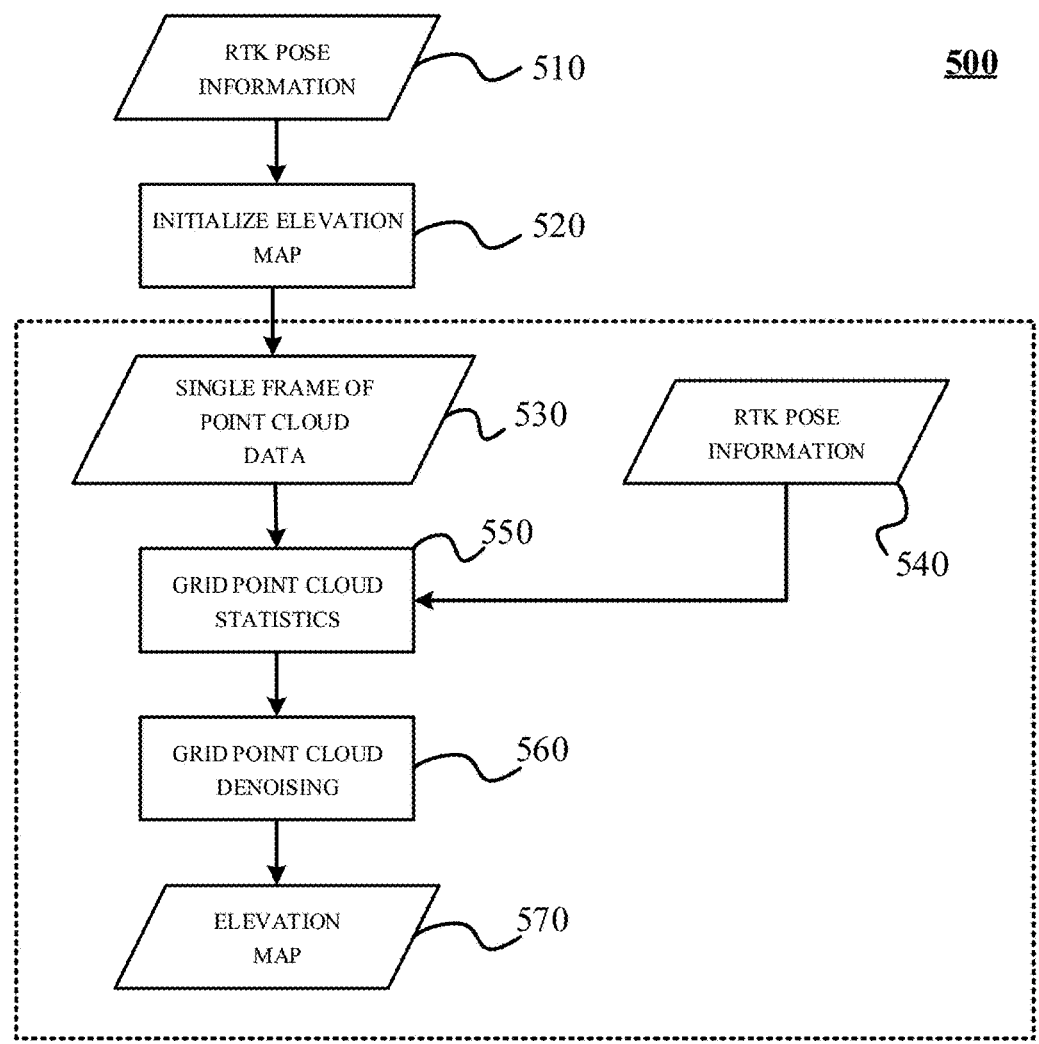
FIG. 5 illustrates a schematic diagram of a terrain detecting process according to an embodiment of the disclosure.

FIG. 5 illustrates a schematic diagram of a terrain detecting process 500 according to an embodiment of the disclosure. As shown in FIG. 5, the process 500 includes steps 510 to 570. In steps 510 to 570, the step shown in a parallelogram block represents a data input/output step, and the step shown in a rectangular block represents a data processing step.

In step 510, the pose information is collected through the RTK module to determine a position of the engineering equipment.

In step 520, a region with a certain size (for example, 100 m*100 m) using the engineering equipment as a center is used as the operating region, which is divided into a plurality of grids with a fixed size (for example, 0.2 m*0.2 m) to obtain an initialized elevation map.

In steps 530 and 540, a single frame of point cloud data (relative to a laser radar coordinate system) collected by the laser radar at a current time and the pose information collected by the RTK module are obtained, respectively.

In step 550, based on the pose information collected by the RTK module, the point cloud data obtained in step 530 are transformed to under a world coordinate system, and a grid corresponding to each sampling point is determined based on the three-dimensional coordinate of each sampling point. Accordingly, a sampling point set corresponding to each grid may be obtained. Furthermore, for each grid, the sampling point with the largest height coordinate in the sampling point set corresponding to the grid is used as the input point of the grid.

In step 560, the point cloud data of the grid are denoised, that is, it is determined that whether the input point of the grid is the noise point or the ground point.

Subsequently, in step 570, the height value of the grid is updated based on a determination result of step 560. Specifically, if the input point is determined as the ground point in step 560, the height value of the grid is updated based on the height coordinate of the ground point.

It can be understood that steps 530 to 570 may be executed repeatedly, so that real-time and dynamic detection of the operating terrain is realized.

Figure 6:
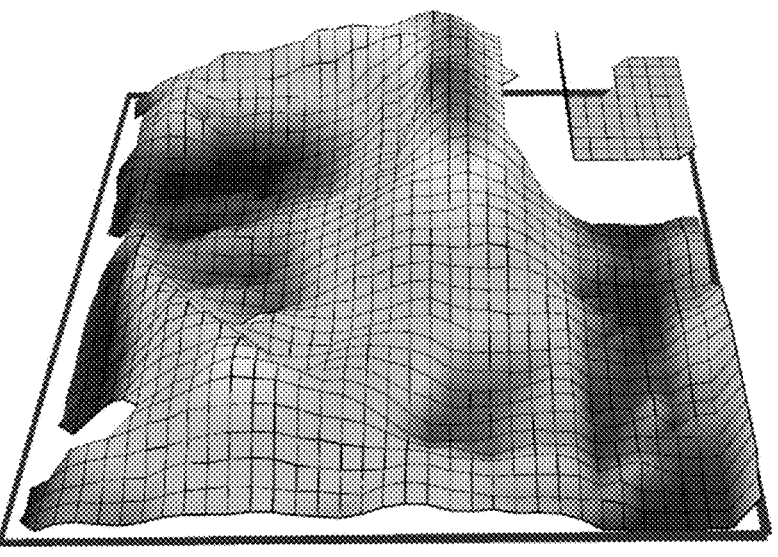
FIG. 6 illustrates a schematic diagram of a terrain detection result (an elevation map) according to an embodiment of the disclosure.

FIG. 6 illustrates a schematic diagram of an operating terrain detection result (an elevation map) according to an embodiment of the disclosure. A vertex of each mesh in FIG. 6 corresponds to a grid in a grid elevation map, and different gray values represent different height values. A height value of the vertex of each mesh corresponds to the height value of the grid, and the height values of the other positions (for example, a side or a surface of each mesh) are obtained through interpolation.

According to the embodiment of the disclosure, the accurate detection of the operating terrain can still be realized under the condition that there is a large quantity of dusts in the environment.

Figure 7A:
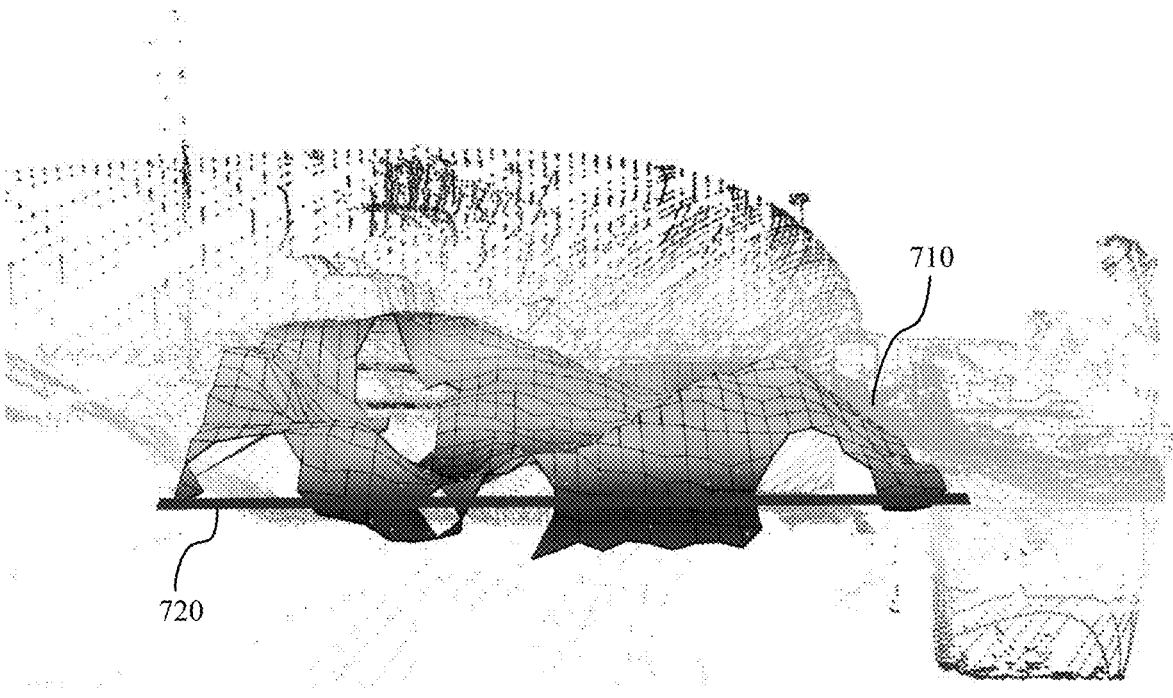
FIG. 7A and FIG. 7B illustrate schematic diagrams of a terrain detection result under a condition of less dusts according to an embodiment of the disclosure.
Figure 7B:
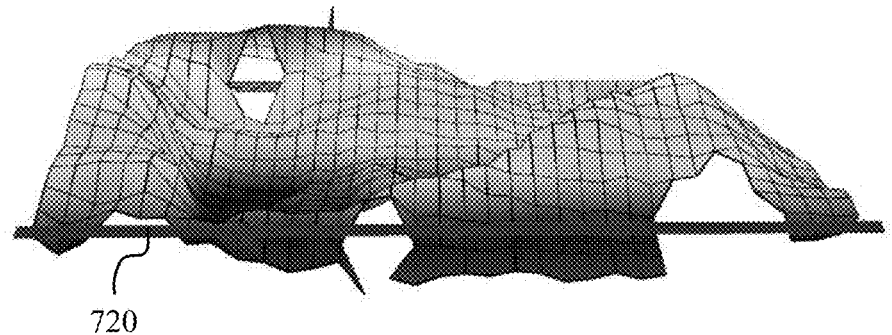

FIG. 7A and FIG. 7B illustrate schematic diagrams of a terrain detection result under a condition of less dusts according to an embodiment of the disclosure. As shown in FIG. 7A and FIG. 7B, under the condition of less dusts in the environment, fewer noise points are existed in the point cloud data, and the point cloud data 710 are substantially identical with the generated grid elevation map 720.

Figure 8A:
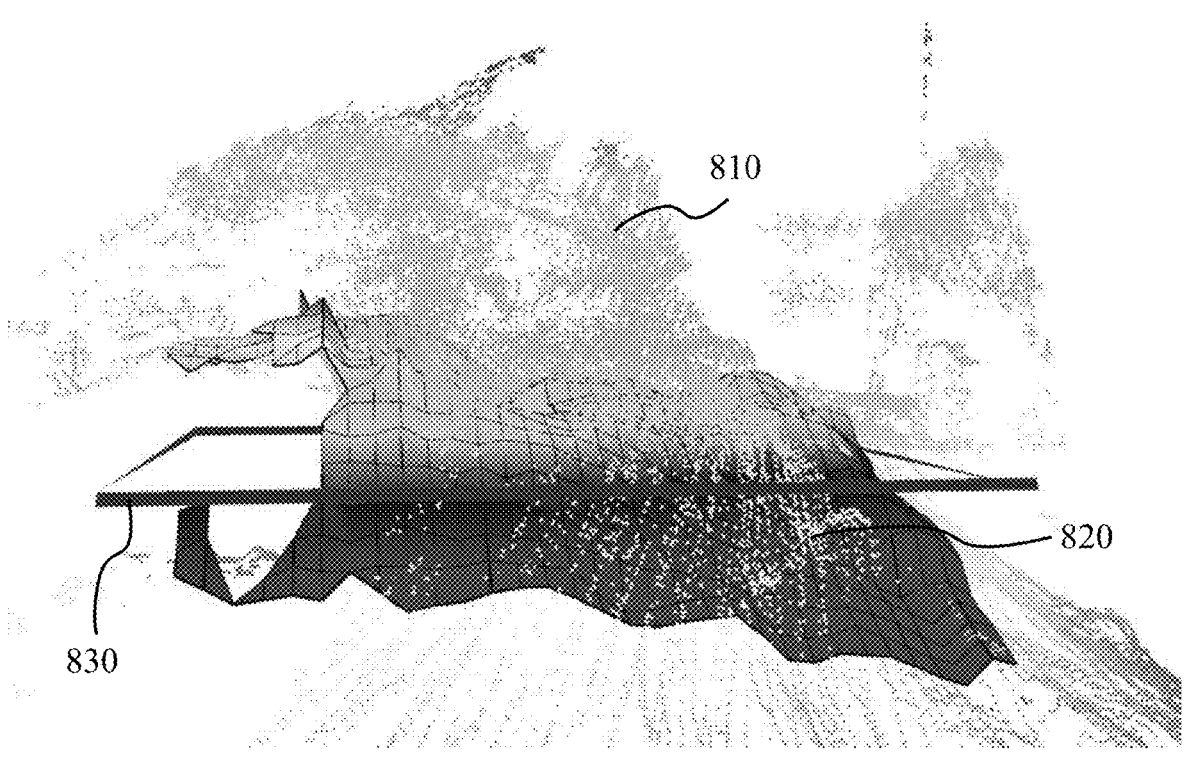
FIG. 8A and FIG. 8B illustrate schematic diagrams of a terrain detection result under a condition of more dusts according to an embodiment of the disclosure.
Figure 8B:
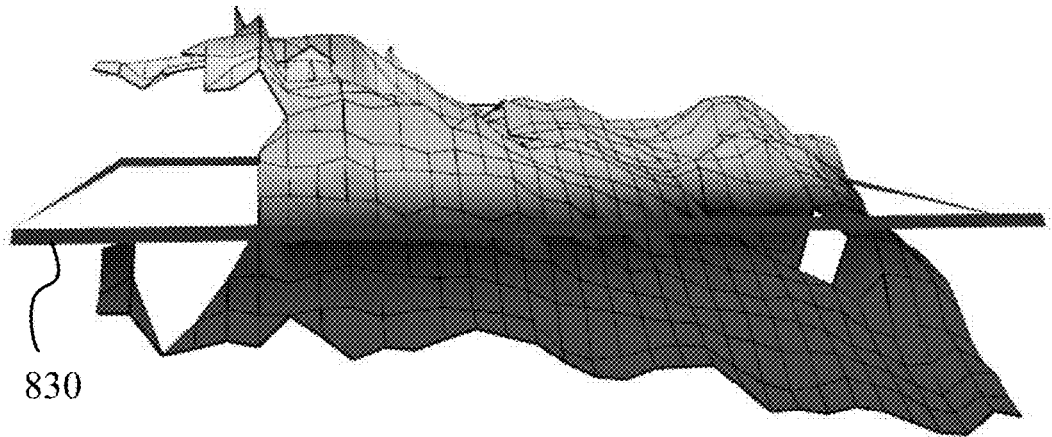

FIG. 8A and FIG. 8B illustrate schematic diagrams of a terrain detection result under a condition of more dusts according to an embodiment of the disclosure. As shown in FIG. 8A and FIG. 8B, under the condition of more dusts in the environment, a large quantity of noise points 810 are existed in the point cloud data. According to the method of the embodiment of the disclosure, the noise points 810 can be effectively filtered out, and the grid elevation map 830 is generated solely based on the point cloud data 820 for the ground, so that the accurate detection of the operating terrain is realized.

Figure 9:
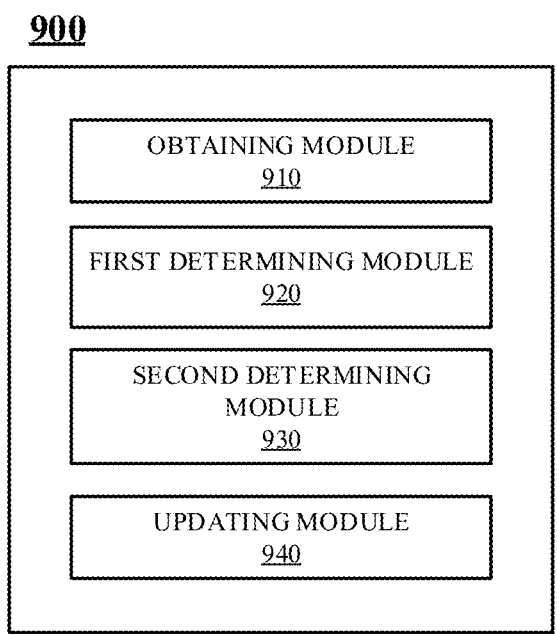
FIG. 9 illustrates a structural block diagram of an apparatus for detecting an operating terrain according to an embodiment of the disclosure.

According to an embodiment of the disclosure, an apparatus for detecting an operating terrain is further provided. FIG. 9 illustrates a structural block diagram of an apparatus 900 for detecting an operating terrain according to an embodiment of the disclosure. As shown in FIG. 9, the apparatus 900 includes:

an obtaining module 910 configured to obtain point cloud data of an operating region that are collected by a laser radar at a current time, wherein the operating region is divided into a plurality of grids, and each grid of the plurality of grids has a corresponding height value, and wherein the point cloud data include three-dimensional coordinates of a plurality of sampling points;

a first determining module 920 configured to, for any grid among the plurality of grids, determine an input point of the grid from the plurality of sampling points based on the three-dimensional coordinates of the plurality of sampling points;

a second determining module 930 configured to determine a type of the input point based on the height coordinate of the input point and a height value of the grid, wherein the type includes a noise point and a ground point; and an updating module 940 configured to update the height value of the grid based on the height coordinate of the input point in response to determining that the input point is the the ground point.

According to the embodiment of the disclosure, by means of obtaining in real time the point cloud data that are collected by the laser radar and based on the three-dimensional coordinate of each sampling point, the sampling point (that is, the input point) used for updating the height value of the grid corresponding to each grid is determined. Furthermore, it may be determined that whether the input point of the grid is the noise point or the ground point, and the height value of the grid is updated solely based on the height coordinate of the ground point, so that the noise point can be effectively filtered, the accuracy of terrain detection can be improved, and the accurate and real-time operating terrain detection can be realized.

According to some embodiments, the point cloud data are obtained by scanning the operating region via the laser radar according to a non-repetitive scanning path.

According to some embodiments, the first determining module 920 includes a first determining unit configured to determine a sampling point set corresponding to the grid based on the three-dimensional coordinates of the plurality of sampling points, wherein the sampling point set includes sampling points in the grid; and a second determining unit configured to use a sampling point with the largest height coordinate in the sampling point set as the input point.

According to some embodiments, the second determining module 930 is further configured to determine the input point as the noise point in response to determining that a difference between the height coordinate and the height value is greater than a first threshold.

According to some embodiments, the second determining module 930 is further configured to determine the input point as the ground point in response to determining that any of the following conditions is met: the difference between the height coordinate and the height value is smaller than or equal to the first threshold; or the difference between the height coordinate and the height value is greater than the first threshold, and the quantity of input points of the grid determined as noise points within a preset duration is greater than or equal to a second threshold.

According to some embodiments, the apparatus 900 further includes a first adding module configured to add the input point into a noise point container corresponding to the grid in response to determining that the input point is the noise point; and a first deleting module configured to delete a noise point with the earliest collection time in the noise point container in response to determining that the quantity of noise points in the noise point container is greater than or equal to a third threshold.

According to some embodiments, the apparatus 900 further includes a second adding module configured to add the input point into a ground point container corresponding to the grid in response to determining that the input point is the ground point; and a second deleting module configured to delete a ground point with the earliest collection time in the ground point container in response to determining that the quantity of ground points in the ground point container is greater than or equal to a fourth threshold.

According to some embodiments, the updating module 940 is further configured to update the height value of the grid to be an average value of the height coordinates of the ground points in the ground point container.

According to some embodiments, an initial value of the height value of the grid is the height coordinate of a first input point of the grid.

It should be understood that modules or units of the apparatus 900 shown in FIG. 9 may correspond to steps in the method 200 described with reference to FIG. 2. Accordingly, operations, features and advantages described for the method 200 are also suitable for the apparatus 900 as well as the modules and units included therein. For being concise, some operations, features and advantages are not described in detail here.

Though specific functions are discussed above with reference to specific modules, it should be noted that functions of the modules discussed herein may be divided into a plurality of modules, and/or at least some functions of the plurality of modules may be combined into a single module. For example, the first determining module 920 and the second determining module 930 described above may be combined into a single module in some embodiments.

It should be further understood that various technologies may be described in general context of a software and hardware element or a program module herein. The modules described in FIG. 9 above may be realized in hardware or hardware combined with software and/or firmware. For example, these modules may be realized as a computer program code/instruction, the computer program code/instruction is configured to be executed in one or more processors and stored in a computer-readable storage medium. Alternatively, these modules may be realized as a hardware logics/circuit. For example, in some embodiments, one or more of the modules 910 to 940 may be realized together in a system on chip (SoC). The SoC may include an integrated circuit chip (including a processor (for example, a central processing unit (CPU), a micro-controller, a micro-processor, a digital signal processor (DSP) and the like, a memory, one or more communication interfaces, and/or one or more components in other circuits), and can optionally execute a received program code and/or include embedded firmware to execute the functions.

According to an embodiment of the disclosure, an electronic device is further provided and includes at least one processor; and a memory in communication connection with the at least one processor. The memory stores instructions that are executable by the at least one processor, and when the instructions are executed by the at least one processor, the at least one processor can execute the above method for detecting the operating terrain.

According to an embodiment of the disclosure, a non-transitory computer-readable storage medium storing computer instructions is further provided. The computer instructions are configured to make a computer execute the above method for detecting the operating terrain.

According to an embodiment of the disclosure, a computer program product is further provided, which includes a computer program. The computer program, when executed by a processor, implements the above method for detecting the operating terrain.

According to an embodiment of the disclosure, an engineering equipment for detecting an operating terrain is further provided and includes the above electronic device.

Figure 10:
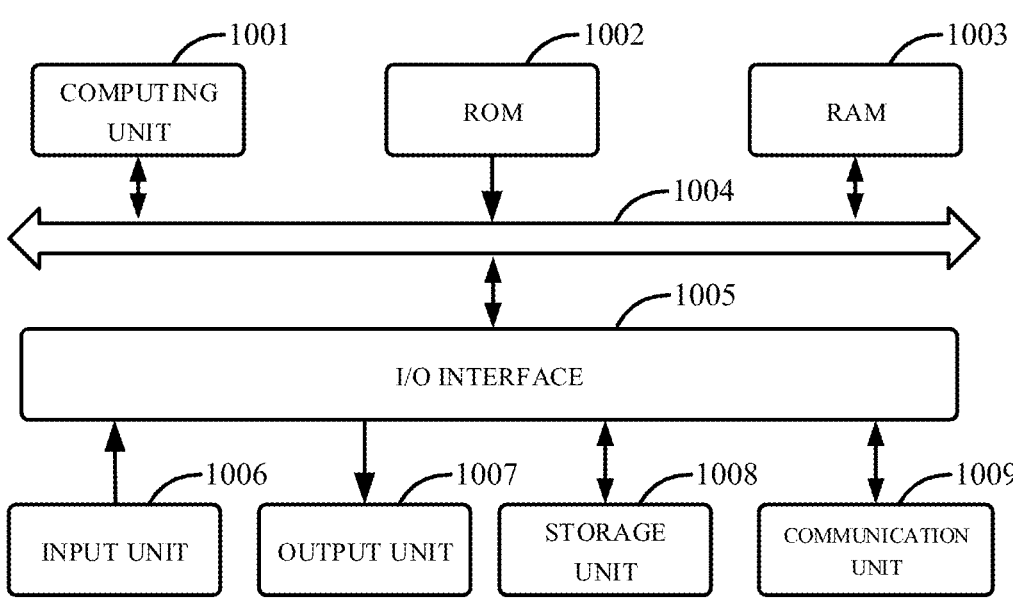
FIG. 10 illustrates a structural block diagram of an example electronic device capable of being used for implementing embodiments of the disclosure.

Referring to FIG. 10, a structural block diagram of an electronic device 1000 capable of serving as a server or a client of the disclosure is described now, which is an example of a hardware device applicable to various aspects of the disclosure. The electronic device intends to represent various digital electronic computer devices, such as a laptop computer, a desktop computer, a working platform, a personal digital assistant, a server, a blade server, a mainframe computer and other suitable computers. The electronic device may also represent various mobile apparatuses, such as a personal digital assistant, a cell phone, a smartphone, a wearable device and other similar computing apparatuses. Components shown herein, their connections and relations and their functions are only examples and do not intend to limit implementation of the disclosure described and/or required herein.

As shown in FIG. 10, the electronic device 1000 includes a computing unit 1001, which can execute various appropriate actions and processing according to a computer program stored in a read-only memory (ROM) 1002 or a computer program loaded from a storage unit 1008 to a random access memory (RAM) 1003. The RAM 1003 can also store various programs and data needed by operations of the electronic device 1000. The computing unit 1001, the ROM 1002 and the RAM 1003 are mutually connected through a bus 1004. An input/output (I/O) interface 1005 is also connected to the bus 1004.

A plurality of components in the electronic device 1000 are connected to the I/O interface 1005, including: an input unit 1006, an output unit 1007, the storage unit 1008, and a communication unit 1009. The input unit 1006 may be any type of devices capable of inputting information to the electronic device 1000, which can receive input number or character information and generate key signal input related to user setting and/or function control of the electronic device, and may include but not limited to a mouse, a keyboard, a touch screen, a trackpad, a trackball, a joystick, a microphone and/or a remote-control unit. The output unit 1007 may be any type of devices capable of displaying information, and may include but not limited to a display, a speaker, a video/audio output terminal, a vibrator and/or a printer. The storage unit 1008 may include but not limited to a magnetic disk and an compact disc. The communication unit 1009 allows the electronic device 1000 to exchange information/data with other devices through a computer network, such as Internet, and/or various telecommunication networks, and may include but not limited to a modem, a network card, an infrared communication device, a wireless communication transceiver and/or a chipset, for example, a Bluetooth™ device, a 802.11 device, a Wi-Fi device, a WiMAX device, a cellular communication device and/or similar items.

The computing unit 1001 may be various general-purpose and/or special-purpose processing components with processing and computing capacities. Some examples of the computing unit 1001 include but not limited to a central processing unit (CPU), a graphics processing unit (GPU), various special-purpose artificial intelligence (AI) computing chips, various computing units for running a machine learning model algorithm, a digital signal processor (DSP), and any appropriate processor, controller, microcontroller and the like. The computing unit 1001 executes each method and processing described above, for example, the method 200. For example, in some embodiments, the method 200 may be implemented as a computer software program, which is tangibly contained in a machine-readable medium, for example, the storage unit 1008. In some embodiments, a part of or all of the computer program may be loaded and/or mounted onto the electronic device 1000 via the ROM 1002 and/or the communication unit 1009. When the computer program is loaded to the RAM 1003 and executed by the computing unit 1001, one or more steps of the method 200 described above can be executed. Alternatively, in other embodiments, the computing unit 1001 may be configured to execute the method 200 through any other suitable modes (for example, by means of firmware).

Various implementations of the systems and technologies described above herein may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, the feedback provided to the users may be any form of sensory feedback (e.g., a visual feedback, an auditory feedback, or a tactile feedback); an input from the users may be received in any form (including an acoustic input, a voice input or a tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relation between the client and the server is generated by running a computer program with a mutual client-server relation on a corresponding computer. The server may be a cloud server or may also be a server of a distributed system, or a server combined with a blockchain.

It should be understood that steps can be reordered, added or deleted by using various forms of flows shown above. For example, the steps recorded in the disclosure can be executed in parallel, or in sequence or in different orders, which is not limited herein as long as a desired result of the technical solutions disclosed by the disclosure can be realized.

Though the embodiments or the examples of the disclosure are already described with reference to the accompanying drawings, it should be understood that the above methods, systems and devices are only example embodiments or examples, and the scope of disclosure is not limited by these embodiments or examples but limited only by the scope of the allowed claims and their equivalents. Various elements in the embodiments or the examples can be omitted or replaced by their equivalent elements. Besides, the steps may be executed in sequence different from a sequence described in the disclosure. Furthermore, various elements in the embodiments or the examples may be combined in various modes. What counts is that with technology evolution, many elements described here can be replaced by equivalent elements appearing after the disclosure.

The invention claimed is:

1. A computer-implemented method for detecting an operating terrain, comprising:

obtaining point cloud data of an operating region that are collected by a laser radar at a current time, wherein the operating region is divided into a plurality of grids, and each grid of the plurality of grids has a corresponding height value, and wherein the point cloud data comprise three-dimensional coordinates of a plurality of sampling points;

for any grid among the plurality of grids:

determining a sampling point set corresponding to the grid, based on the three-dimensional coordinates of the plurality of sampling points, wherein the sampling point set comprises the sampling points in the grid;

using a sampling point with a largest height coordinate in the sampling point set as the input point, wherein the input point is selected from the sampling point set to determine an update of the height value of the grid;

determining a type of the input point, based on a height coordinate of the input point and the height value of the grid, wherein the type comprises a noise point and a ground point, wherein the input point is determined as the ground point is based on a condition that the difference between the height coordinate of the input point and the height value of the grid is greater than a first threshold, and a quantity of the input points of the grid determined as the noise points within a preset duration is greater than or equal to a second threshold; and in response to determining that the input point is the ground point, updating the height value of the grid based on the height coordinate of the input point.

2. The method according to claim 1, wherein the point cloud data are obtained by scanning the operating region via the laser radar according to a non-repetitive scanning path.

3. The method according to claim 1, further comprising:

in response to determining that the input point is the noise point, adding the input point into a noise point container corresponding to the grid; and in response to determining that a quantity of the noise points in the noise point container is greater than or equal to a third threshold, deleting a noise point with the earliest collection time in the noise point container.

4. The method according to claim 1, further comprising:

in response to determining that the input point is the ground point, adding the input point into a ground point container corresponding to the grid; and in response to determining that a quantity of the ground points in the ground point container is greater than or equal to a fourth threshold, deleting a ground point with the earliest collection time in the ground point container.

5. The method according to claim 4, wherein in response to determining the input point is the ground point, updating the height value of the grid based on the height coordinate of the input point, comprises:

updating the height value of the grid to be an average value of the height coordinates of the ground points in the ground point container.

6. The method according to claim 1, wherein an initial value of the height value of the grid is the height coordinate of a first input point of the grid.

7. An electronic device, comprising:

at least one processor; and a memory in communication connection with the at least one processor, wherein the memory stores instructions executable by the at least one processor, and the instructions, when executed by the at least one processor, enable the at least one processor to perform processing comprising:

obtaining point cloud data of an operating region that are collected by a laser radar at a current time, wherein the operating region is divided into a plurality of grids, and each grid of the plurality of grids has a corresponding height value, and wherein the point cloud data comprise three-dimensional coordinates of a plurality of sampling points;

for any grid among the plurality of grids:

determining a sampling point set corresponding to the grid, based on the three-dimensional coordinates of the plurality of sampling points, wherein the sampling point set comprises the sampling points in the grid;

using a sampling point with a largest height coordinate in the sampling point set as the input point, wherein the input point is selected from the sampling point set to determine an update of the height value of the grid;

determining a type of the input point, based on a height coordinate of the input point and the height value of the grid, wherein the type comprises a noise point and a ground point, wherein the input point is determined as the ground point is based on a condition that the difference between the height coordinate of the input point and the height value of the grid is greater than a first threshold, and a quantity of the input points of the grid determined as the noise points within a preset duration is greater than or equal to a second threshold; and in response to determining that the input point is the ground point, updating the height value of the grid based on the height coordinate of the input point.

8. The electronic device according to claim 7, wherein the point cloud data are obtained by scanning the operating region via the laser radar according to a non-repetitive scanning path.

9. The electronic device according to claim 7, wherein the processing further comprises:

in response to determining that the input point is the noise point, adding the input point into a noise point container corresponding to the grid; and in response to determining that a quantity of the noise points in the noise point container is greater than or equal to a third threshold, deleting a noise point with the earliest collection time in the noise point container.

10. The electronic device according to claim 7, wherein the processing further comprises:

in response to determining that the input point is the ground point, adding the input point into a ground point container corresponding to the grid; and in response to determining that a quantity of the ground points in the ground point container is greater than or equal to a fourth threshold, deleting a ground point with the earliest collection time in the ground point container.

11. The electronic device according to claim 10, wherein in response to determining the input point is the ground point, updating the height value of the grid based on the height coordinate of the input point, comprises:

updating the height value of the grid to be an average value of the height coordinates of the ground points in the ground point container.

12. The electronic device according to claim 7, wherein an initial value of the height value of the grid is the height coordinate of a first input point of the grid.

13. A non-transitory computer-readable storage medium storing computer instructions, wherein the computer instructions are configured to enable a computer to perform processing comprising:

obtaining point cloud data of an operating region that are collected by a laser radar at a current time, wherein the operating region is divided into a plurality of grids, and each grid of the plurality of grids has a corresponding height value, and wherein the point cloud data comprise three-dimensional coordinates of a plurality of sampling points; for any grid among the plurality of grids:

determining a sampling point set corresponding to the grid, based on the three-dimensional coordinates of the plurality of sampling points, wherein the sampling point set comprises the sampling points in the grid;

using a sampling point with a largest height coordinate in the sampling point set as the input point, wherein the input point is selected from the sampling point set to determine an update of the height value of the grid;

determining a type of the input point, based on a height coordinate of the input point and the height value of the grid, wherein the type comprises a noise point and a ground point, wherein the input point is determined as the ground point is based on a condition that the difference between the height coordinate of the input point and the height value of the grid is greater than a first threshold, and a quantity of the input points of the grid determined as the noise points within a preset duration is greater than or equal to a second threshold; and in response to determining that the input point is the ground point, updating the height value of the grid based on the height coordinate of the input point.

* * * * *